Sept. 29, 1959     F. G. VAN DE WATER     2,906,151
VISE HAVING OPPOSED JAWS EACH ADJUSTABLE BY A DISPLACEABLE SCREW
Filed Feb. 13, 1958
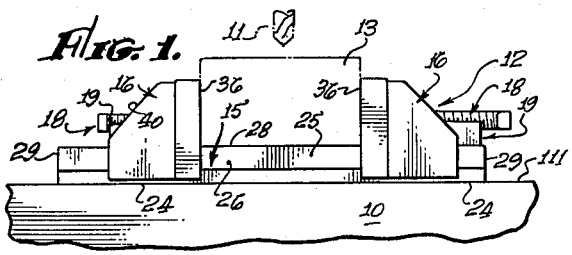
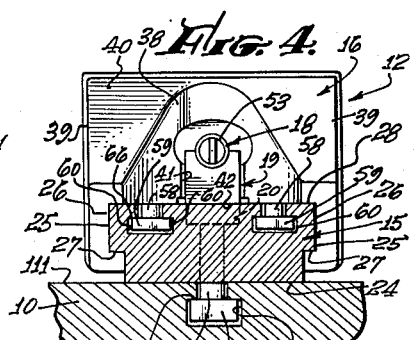
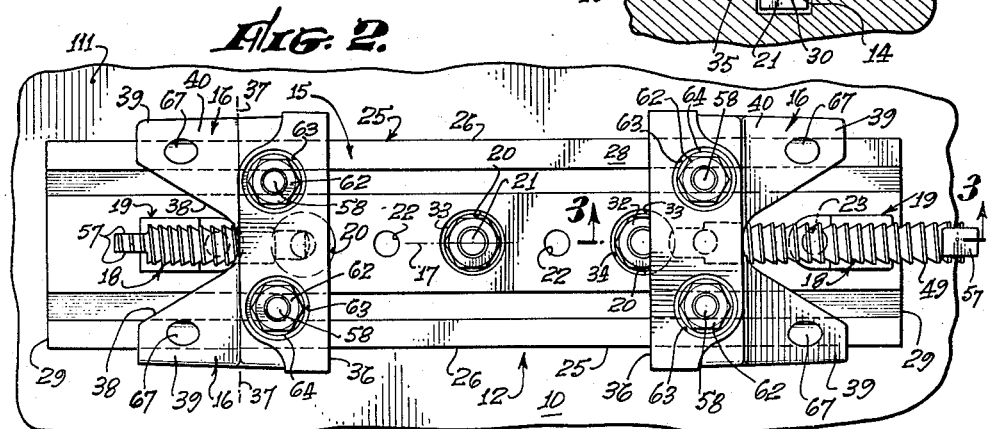
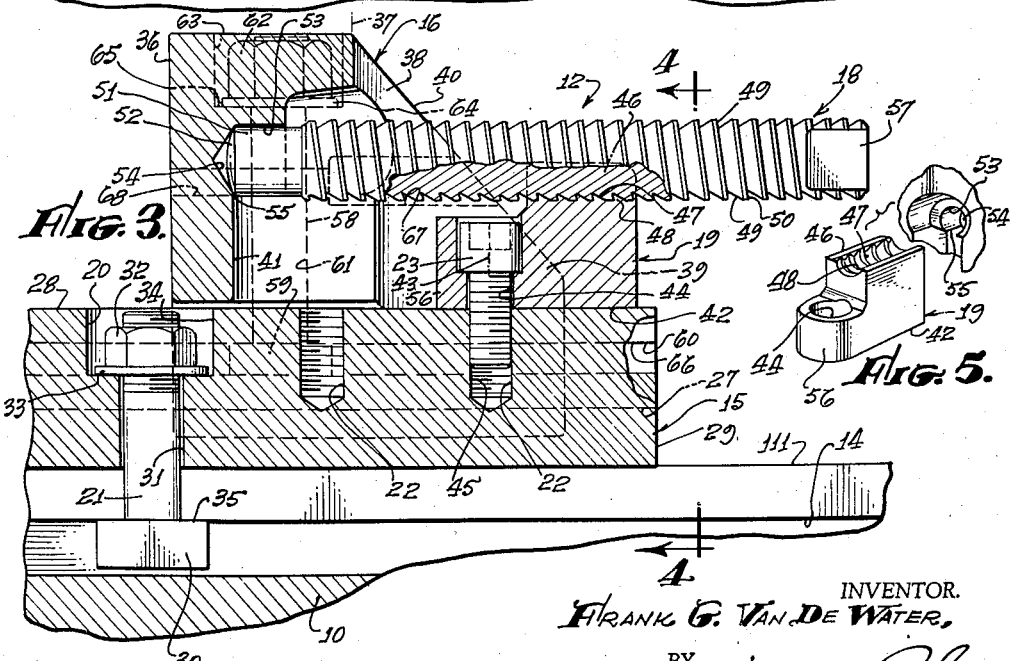
INVENTOR.
FRANK G. VAN DE WATER,
BY William P. Green
ATTORNEY.

United States Patent Office 2,906,151
Patented Sept. 29, 1959

2,906,151

VISE HAVING OPPOSED JAWS EACH ADJUSTABLE BY A DISPLACEABLE SCREW

Frank G. Van de Water, Manhattan Beach, Calif., assignor to Glide Easy Mfg., Torrance, Calif., a corporation of California Application February 13, 1958, Serial No. 715,107

2 Claims. (Cl. 81—29)

This invention relates to improved vise structures for clamping a workpiece between a pair of jaws. In certain respects, a vise embodying the invention is particularly useful for mounting a workpiece in a desired position on a machine tool, as for instance on a milling machine.

In a conventional vise, one of the two work-holding jaws is usually mounted stationarily to the base of the vise, and the other jaw is then actuable toward and away from the first jaw to clamp a workpiece between the jaws. For many purposes, this type of vise having a single movable jaw is entirely satisfactory. However, for some other uses such a vise has certain definite disadvantages.

A first disadvantage of such a vise resides in the fact that, since one of the two jaws is stationary, the vise allows for no adjustment of the positioning of the work piece in the direction of movement of the adjustable jaw. The only way in which the workpiece can be shifted in that direction is by bodily moving the entire vise relative to the support to which it is mounted. A second disadvantage of the conventional vise lies in the tendency for the stationary jaw to bend slightly, when the movable jaw is tightened against a workpiece, with resultant slight shifting of the position of the workpiece. Though the movement of the workpiece may be through only a few thousandths of an inch, even that slight displacement can be very bothersome when the vise is intended to accurately position a workpiece on a machine tool.

The general object of the present invention is to provide a vise structure which is designed to overcome the above discussed disadvantages of conventional vises. These results are achieved in large part by so forming the vise that both of its work-holding jaws are separately adjustable, relative to the base of the tool and relative to each other. More specifically, each of the two jaws is mounted for sliding movement along the base, and each jaw has a separate actuating screw for shifting the jaw relative to the base. This arrangement allows for shifting of the workpiece to any of numerous different settings without movement of the base, so that the workpiece may be accurately but easily located on a machine tool. Also, the two screws are desirably so positioned and constructed that their forces balance one another upon tightening of the jaws, so that one jaw can not overcome or bend the other jaw and effect an undesired shifting of the workpiece. For best operation, the vise also includes means for positively and rigidly locking the jaws in any desired set position. Also, an increased adjustment of the jaws may be attained by providing for mounting of the nut elements, which coact with the actuating screws, at any of different positions along the base.

The above and other features of the present invention will be better understood from the following detailed description of the typical embodiment illustrated in the accompanying drawing in which:

Fig. 1 is a side view of a vise constructed in accordance with the invention, and shown attached to the work-holding bed of a fragmentarily represented milling machine or other machine tool;

Fig. 2 is an enlarged plan view of the Fig. 1 vise;

Fig. 3 is a further enlarged fragmentary vertical section taken on 3—3 of Fig. 2;

Fig. 4 is a reduced-scale, transverse vertical section taken on line 4—4 of Fig. 3, and Fig. 5 is an exploded perspective view of one of the half-nut elements of the vise and of a vise-jaw recess that journals the pressure-applying end of a jaw-actuating screw.

In the figures, I have represented at 10 the work-supporting bed of a conventional milling machine or other machine tool, whose rotary milling cutter or other powered cutting tool is represented at 11. The vise 12 constructed in accordance with the present invention is mounted on the surface 111 of bed 10, and acts to hold a workpiece 13 rigidly in a desired position while the cutter 11 makes a cut on the work piece. The bed 10 of the machine tool contains the usual T slot 14 extending horizontally therein beneath the upper surface 111, and having the T-shaped cross section represented in Fig. 4, for securing the vise 12 to bed 10.

The vise itself includes a rigid base member 15 which is adapted to be attached in fixed relation to the bed 10. To this base member 15, there are movably mounted a pair of work-engaging-and-gripping jaws 16. The jaws 16 are separately actuable toward and away from one another, and along an axis 17, by means of a pair of separate actuating screws 18. The two screws 18 engage and coact with a pair of separate half nut elements 19 (see Fig. 5), which are adapted to be attached at different locations to base member 15.

Base member 15 is preferably of uniform cross section along its entire length in the direction of axis 17 (see cross-sectional shape of Fig. 4), except that this cross section is interrupted at three locations 20 to receive mounting bolts 21, and the cross section is also interrupted at several locations 22, typically five locations, to provide openings for receiving bolts or screws 23 for attaching nut elements 19 to the base 15. To describe more specifically the cross-sectional configuration of base 15, this base member has a planar horizontal undersurface 24 which rests on and engages upper surface 111 of the bed 10 of the machine tool. At its opposite sides, base member 15 forms a pair of oppositely directed projections or ways 25, which jaws 16 slidably engage, to mount the jaws for the desired individual sliding movement along axis 17. The two projections or ways 25 have parallel, vertical side surfaces 26, downwardly facing, bottom guide surfaces 27, and upper, horizontal guide surfaces which form the edge portion of the horizontal planar top surface 28 of base 15. At its opposite ends, the base 15 may be cut off transversely, to form a pair of vertical parallel end faces 29 extending directly transversely of axis 17.

As will be understood from Figs. 2, 3 and 4, each of the bolts 21 is preferably a T bolt, having a lower, enlarged head portion 30 which is movably received and confined within the lower enlarged-diameter portion of T slot 14. The shank of each bolt 21 extends upwardly through the reduced-dimension portion of T slot 14, and then through a small-diameter portion 31 of the corresponding opening 20 in base 15, with a nut 32 and washer 33 being received about the upper threaded end of bolt 21, and being received within the upper enlarged-diameter portion 34 of opening 20. The tightening of nut 22 relative to T bolt 21 (whose lower head is of the usual rectangular construction to prevent it from turning within T slot 14) causes washer 33 to be tightened downwardly against base 15, while the head of T bolt 21 is tightened upwardly against member 10 at the shoulders 35, to thus very tightly and rigidly secure base 15 to machine tool bed 10 at a desired fixed location. Preferably three of the bolts 21 and associated nuts and washers are utilized in the three openings 21 of base 15. These three openings 21 and the contained bolts are desirably aligned with one another in the direction of axis 17.

With regard now to the construction of the two movable jaws 16, these jaws provide at their inner sides a pair of parallel, vertical, opposed work-engaging faces 36, which are desirably of substantially identical shape, and which extend across the entire inner sides of the jaws. A workpiece 13 to be gripped by the vise is placed on the upper horizontal surface 28 of base member 15, and is engaged at its opposite sides by the two jaw surfaces 36, at locations above the plane of base surface 28. The jaw faces 36 are of rectangular configuration and each of the jaw elements 16 preferably has approximately that same rectangular, vertical sectional configuration from the location of face 36 back to a plane 37 spaced from face 36. Beyond that plane, each of the jaw elements has a generally V-shaped recess 38 extending into its outer side, to receive the associated actuating screw 18, and which recess divides that portion of the jaw element 16 into a pair of side projections 39 adjacent the tracks or ways 26 on base 15. The two portions 39 of each jaw element 16 preferably have their upper surfaces inclined progressively downwardly in a direction away from the work, as seen at 40 in Figs. 1 and 3. Also, the recess 38 in the jaw element may extend into that element beyond the plane 37, and as seen at 41 in Fig. 3.

In order that the jaw elements may be effectively guided for movement along the ways 25 of base 15, each of the jaw elements is shaped as seen in Fig. 4, to fit about the two ways or tracks 25, and to slidably engage the side surfaces 26, undersurfaces 27, and upper surface 28 of member 15, so that the jaw elements are free only for sliding movement in the direction of axis 17 relative to base 15. The fit of jaws 16 on base member 15 is sufficiently close to prevent any substantial amount of play between the parts.

Referring now to Figs. 3 and 5, each of the two half nut elements 19 has a horizontal planar undersurface 42 which rests on the upper surface 28 of base member 15. The bolt 23, centered about a vertical axis 43, extends downwardly through an opening 44 in element 19, and threadedly connects into one of the vertically extending threaded bores or openings 22 formed in the upper side of base member 15. Axially outwardly beyond screw 23, each nut element has an upwardly projecting portion 46, which contains a half-nut recess 47 within which there are formed a series of half threads 48 for engaging the corresponding threads 49 of the associated actuating screw 18. As seen clearly in Fig. 3, these threads of elements 18 and 19 are of the type known as "buttress threads," so that the actuating screws 18 are held by the threads in engagement with nut 19, even though the nuts extend around only half of each of the actuating screws. More specifically, each of these threads has a first inclined side or face 49, extending at a relatively gradual inclination, while at the opposite side of the same thread, the thread has a second side surface 50 which is inclined much more abruptly with respect to the axis of the screw. Each of the nut elements 19 can be attached by its screw 23 to any selected one of the threaded openings 22 in base 15, to thus allow for a coarse adjustment of jaws 16 relative to one another and relative to the base.

The inner end of each screw 18 may have an externally cylindrical portion 51, presenting a slightly convex end face 52. Portion 51 is movably received and confined within a correspondingly cylindrical bore 53 formed in the associated jaw element 16, which bore terminates in a tapering recess 54 against which the convex end 52 of the screw bears axially. At its under side, the wall of bore 53 may be interrupted at 55 (see Fig. 5), to merge at that point with the increased-depth portion 41 of the previously mentioned recess 38 formed in the jaw element. This increased-depth portion 41 of the recess 38 then is capable of receiving the inner, externally cylindrical reduced-height portion 56 of the corresponding nut element 19, so that each jaw 16 is free for a maximum amount of axial movement relative to the associated part 19, and into interfitting engagement with that nut element. To allow turning of each screw 18, for actuating the jaw, the axially outer end of each screw has a pair of parallel axial flats 57 formed on its opposite sides, to permit engagement of the end of the screw with a wrench for turning the screw. The two screws 18 are directly axially aligned with one another along axis 17, and therefore engage the two jaw elements 16 at directly axially opposite locations. Also, these areas of engagement of the two screws 18 with jaws 16 at tapered recesses 54, are located at substantially the center of the upstanding work-engaging portions of jaw surfaces 36 (above base surfaces 28). This will be clearly understood from Figs. 2, 3 and 4. One of the screws 18 may if desired be somewhat shorter than the other screw, as seen in Fig. 2.

For locking the jaws 16 in any desired adjusted position, there are provided in each of the jaws a pair of parallel, vertical locking screws or bolts 58, which take the form of T bolts having enlarged heads 59 of rectangular horizontal section received within the lower enlarged portions of T slots 60 formed in base member 15. As seen in Fig. 4, there are two of these T slots 60 formed in the upper side of base 15, and extending parallel to axis 17. These slots 60 are of uniform cross section along their entire length, and thus allow for movement of T bolts 58 axially within slots 60 upon axial adjustment of jaws 16. The shanks of T bolts 58 extend directly vertically upwardly through openings 61 in the opposite sides of jaws 16, and have nuts 62 threaded onto their upper ends within enlarged-diameter portions 63 of the passages formed within the jaws. When these nuts 62 are tightened by a suitable wrench relative to bolt 58, each nut tightens an associated washer 64 downwardly against a shoulder 65 formed on jaw 16, while at the same time pulling head 59 of the bolt upwardly against the shoulders 66 formed in T slots 60 of base 15, to tightly clamp the associated jaw downwardly against surface 28 on the base, and thus prevent any slight movement of the jaw relative to the base. The two T bolts 58 of each jaw 16 are offset to opposite sides of the axis 17 of screws 18, and are offset a common distance from that axis.

In some instances, it may be desirable to attach work-engaging jig elements to the inner faces 36 of the two jaws 16. For this purpose, each of the jaws may have a pair of parallel axially extending passages 67 extending through the opposite sides of the jaw, to receive a bolt or screw which may be threadedly connected into the jig or fixture part. As seen in broken lines in Fig. 3, each of these passages 67 may have an enlarged-diameter portion for receiving the head of such a screw, and a reduced-diameter portion 68 for passing the shank of the screw.

In using the illustrated vise, the first step is of course to rigidly secure base 15 to the bed 10 of the machine tool by the three hold-down bolts 21. The two nut elements 19 may then be secured to base 15 at two of the threaded recesses 22 in the base, the two recesses being selected to allow for optimum positioning of the nut elements and jaws relative to a particular workpiece which is to be held. After the nut elements are in position, screws 18 are placed in engagement with the nut elements, and with their inner ends 51 received in the Fig. 3 active position relative to each of the jaws 16. The workpiece 13 may then be positioned between the two jaws, and the two screws 18 may be turned by their wrench-engageable ends 57, until the jaws engage and grip the workpiece at a proper location. Since both of the jaws can be adjusted by their separate screws 18, the workpiece 13 may be very accurately located in any desired plane relative to cutting tool 11. Also, this separate adjustment of the two jaws allows for subsequent holding of different workpieces in different positions along axis 17, by merely moving the two jaws individually to proper locations relative to base 15, and without the necessity for moving the base relative to bed 10. This feature has proven to be extremely helpful in instances in which a series of the vises are utilized along the base 10 of a single machine tool, in which case the jaws of the different vises may be individually set to any of numerous different locations to hold different relatively offset portions of a single-workpiece, following which the jaws of the different vises may subsequently be moved to entirely different settings for holding an entirely different workpiece, all without moving the bases 15 of any of the vises. The adjustability of the jaws is enhanced by the capacity of nut elements 19 for attachment to base 15 at any of different locations, by virtue of the engagement of screws 23 with the different threaded bores 22.

During the tightening of one of the jaws 16 relative to the other jaw, the second jaw is very effectively backed up by a screw 18 which is directly axially opposite the other screw 18 which is being adjusted. Since these screws are opposite one another, and engage the jaws at approximately the centers of their faces 36, and since the screws are of the same size and strength transversely (being formed of the same material), each screw resists axial forces exerted by its associated jaw with the same strength and effectiveness as the other screw, so that tightening of one screw does not bend back the opposite jaw slightly, as is true in many prior vises where only a single actuating screw is employed, and the opposite jaw is stationary and not backed up by a screw such as that shown at 18.

I claim:

1. A vise comprising a base having ways formed thereon, a first work-engaging jaw mounted on said ways for movement relative to the base along a predetermined axis, a second jaw mounted on said ways for movement relative to said base along said axis and toward and away from the first jaw, said jaws being adapted to receive and grip a workpiece therebetween, a first nut element carried by the base, a first actuating screw extending in essentially the direction of said axis at the axially outer side of said first jaw and engaging said nut element and operable to actuate said first jaw axially in response to rotation of the screw, a second nut element carried by the base, a second screw extending in essentially the direction of said axis at the axially outer side of said second jaw and engaging said second nut element and operable to actuate said second jaw axially independently of the movement of said first jaw so that a workpiece may be clamped between the jaws at any of different locations along said ways, said nut elements being formed separately from said base, there being a series of openings in said base axially spaced along said axis, and a pair of screws for securing said nut elements respectively to said base and each connectible selectively into different ones of said openings to attach the associated nut element to the base in any selected position along said axis.

2. A vise comprising a base having ways formed thereon, a first work-engaging jaw mounted on said ways for movement relative to the base along a predetermined axis, a second jaw mounted on said ways for movement relative to said base along said axis and toward and away from the first jaw, said jaws being adapted to receive and grip a workpiece therebetween, a first nut element carried by the base, a first actuating screw extending in essentially the direction of said axis at the axially outer side of said first jaw and engaging said nut element and operable to actuate said first jaw axially in response to rotation of the screw, a second nut element carried by the base, a second screw extending in essentially the direction of said axis at the axially outer side of said second jaw and engaging said second nut element and operable to actuate said second jaw axially independently of the movement of said first jaw so that a workpiece may be clamped between the jaws at any of different locations along said ways, said screws being positioned to exert force against the two jaws respectively at locations that are substantially axially opposite one another and axially opposite approximately the center of the work-holding surfaces of said jaws, each of said nut elements being a half nut having buttress threads coacting with mating buttress threads of the associated screw, said nut elements being formed separately from the base, and there being screws operable to removably and pivotally attach each of said nut elements to the base in any selected one of different axially spaced positions.

References Cited in the file of this patent

UNITED STATES PATENTS

| 381,890 | Taylor | Apr. 24, 1888 |
| 1,090,096 | Blum | Mar. 10, 1914 |
| 1,799,474 | McChesney | Apr. 7, 1931 |
| 2,328,061 | Curtis | Aug. 31, 1943 |
| 2,472,083 | Bartholdy | June 7, 1949 |

FOREIGN PATENTS

| 557,985 | France | May 14, 1923 |